United States Patent Office 3,539,543
Patented Nov. 10, 1970

3,539,543
PROCESS FOR POLYMERIZING VINYLAROMATIC COMPOUNDS IN SUSPENSION
Michael Lederer, Frankfurt am Main, Germany, assignor to Farbwerke Hoechst Aktiengesellschaft vormals Meister Lucius & Bruning, Frankfurt am Main, Germany, a corporation of Germany
No Drawing. Filed Mar. 27, 1968, Ser. No. 716,301
Claims priority, application Germany, May 6, 1967, F 52,342
Int. Cl. C08f 7/04, 15/02
U.S. Cl. 260—85.5                          4 Claims

ABSTRACT OF THE DISCLOSURE

The invention provides a process for polymerizing vinylaromatic compounds in aqueous suspension with the aid of initiators soluble in the monomer, a powdery suspension stabilizer and a water-soluble initiator. A high yield of polymer and uniform particles are obtained using as water-soluble initiator an alkylcarbonato-alkali-sulfato-peroxide.

---

The present invention relates to a process for polymerizing vinylaromatic compounds in aqueous suspension with the aid of an initiator soluble in the monomer, a powdery suspension stabilizer and a water-soluble initiator.

It has been proposed to use as suspension agents in the bead polymerization of vinyl compounds solid, powdery substances which are neither soluble in the monomer nor in water to a noticeable extent. The polymerization is initiated by means of free radical liberating agents such as organic peroxides and/or azo compounds which are dissolved in the monomer. Processes of this type are especially suitable for polymerizing vinylaromatic compounds.

According to the proportion of the phases monomer to water and depending on the amounts and type of the other additives, such as inert oils or dyestuffs, the particles obtained are very non-uniform and large amounts of the polymer deposit on the walls of the reaction vessel. It may even happen that the suspension coagulates completely.

To avoid these phenomena it has been proposed to carry out the polymerization in the presence of a practically neutral tricalcium phosphate having a particle size in the range of from 0.2 to 0.0005 micron and of small amounts of an anionic emulsifier. The use of a low molecular weight emulsifier is, however, detrimental to the quality of the polymer in that especially the sensitivity to water and the transparency of the injection molded articles made therefrom are deteriorated.

It has also been proposed to combine the tricalcium phosphate with water-soluble salts of peroxy-disulfuric acid, for example potassium persulfate. In this case a polymer having a relatively uniform particle size is obtained, but when the polymer is further processed machine elements and the mold are corroded to a greater or lesser extent depending on the amount of persulfate used. Still further it has been proposed to use as water-soluble initiator a carboxyl group-containing azo compound, for example azo-bis-γ-cyano-valeric acid in a relatively high amount. In this process relatively coarse-grained products are obtained and difficulties are encountered if the styrene content in the system of styrene and water is increased to more than 50%. Under comparable conditions coagulation then readily occurs.

It has now been found that the suspension polymerization of vinyl compounds, preferably vinylaromatic compounds, in aqueous phase with the aid of initiators soluble in the monomer, for example peroxides or azo compounds, and a powder suspension stabilizer and a water-soluble initiator can be carried out with advantage and a higher degree of conversion when as water-soluble initiator there are used compounds of the general formula

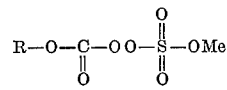

in which R stands for an alkyl radical having 1 to 20 carbon atoms, a cycloalkyl radical having 3 to 8 carbon atoms in the ring, an aryl ar aralkyl radical. As aliphatic radicals having 1 to 20 carbon atoms in a straight or branched chain there are mentioned by way of example methyl, ethyl, octyl, dodecyl, octadecyl. Suitable cycloaliphatic radicals are cyclopropyl, cyclobutyl, cyclohexyl, cycloheptyl or cyclooctyl, and suitable aryl or aralkyl radicals are, for example, phenyl, tolyl, xylyl, or benzyl. In the formula Me stands for an alkali or alkaline-earth metal ion such as lithium, potassium, calcium or magnesium.

Alternatively, the compound of the specified formula can be prepared in situ during the course of the polymerization from haloformic acid ester and peroxysulfuric acid.

The water-soluble peroxide is used in an amount of from 0.0001 to 0.02 and preferably 0.0005 to 0.005 part by weight, calculated on the parts by weight of monomer.

Vinyl compounds which can be polymerized by the process of the invention are preferably vinylaromatic compounds such as, for example, styrene, α-methylstyrene, vinyltoluene, as well as mixtures of these compounds with acrylonitrile, acrylic acid esters, methacrylic acid esters, vinyl ethers or vinyl esters. It is especially advantageous to polymerize styrene and mixtures of styrene with up to 40% by weight of the aforesaid vinyl compounds, acrylonitrile, acrylic acid ester, methacrylic acid ester or vinyl-ester.

Suitable powdery suspension stabilizers are alkaline earth metal salts that are difficultly soluble in water of phosphoric acid and sulfuric acid such as, for example, trimagnesium phosphate, tricalcium phosphate, tristrontium phosphate, tribarium phosphate, aluminium phosphate as well as hydroxyapatite or barium sulfate. The stabilizers are used in an amount of from 0.02 to 1.5% by weight, commercially available qualities being suitable.

The polymerization is initiated by substances yielding radicals such as organic peroxides or azo compounds. Suitable peroxides are diacyl peroxides, peroxy esters, peroxy acetals, ketone peroxides and nitrogen-containing peroxides, either alone or in admixture with one another, for example dibenzoyl peroxide, diisopropyl peroxydicarbonate, tertiary butyl peroxybenzoate, tertiary butyl peroxy-octoate, tertiary butyl peroxyacetate, tertiary butyl peroxypivalate, acetyl-cyclohexane-sulfonyl peroxide. A suitable azo compound is, for example, azo-bisisobutyronitrile. The initiator is used in an amount of from 0.005 to 5 and preferably 0.01 to 1% by weight, calculated on the monomer. The proportion of monomer to water may be chosen in the range of from 1:3 to 3:1.

The polymerization is carried out at a temperature in the range of from 20 to 160° C., advantageously 35 to 130° C.

To carry out the polymerization the components are thoroughly blended with the aid of a stirrer and the blend is polymerized at the specified temperature with the exclusion of air. Cold or hot water is first introduced into the reaction vessel, and the suspension stabilizer and the monomer or monomers with the initiator dissolved therein are added. The water-soluble peroxide can be added at the beginning of the polymerization all at once or discontinuously in small portions. It is advantageous continuously to add in small doses an aqueous solution of the peroxide over a certain period of time. By this mode of operation the distribution of particle sizes may be influenced.

The polymerization batch may further contain small amounts of dyestuffs, mineral oil or paraffin oil, neutral esters of carboxylic acids having 4 to 18 carbon atoms, in the acid component and 14 to 18 carbon atoms in the alcohol component. When the polymerization is terminated the polymer is separated, treated with dilute acids, washed and dried.

The process according to the invention yields polymers having a uniform particle size in a higher yield than known processes. The products obtained have good mechanical and electrical properties and can be worked up to transparent articles.

EXAMPLES 1 AND 2 AND COMPARATIVE EXAMPLES

In a reaction vessel having a capacity of 2 liters a solution of 2.1 grams of benzoyl peroxide in 700 grams of styrene, 7 grams of tricalcium phosphate (TCP) and 430 grams of water were polymerized at 90° C. with a stirring speed of 600 revolutions per minute. The tricalcium phosphate used was commercial grade with a miximum distribution of particle sizes of from 1.7 to 12.0 microns.

A solution of 0.007 gram of cyclohexyl-carbonato-potassium-sulfato-peroxide (CPS) was added in one case at the beginning and after 4 hours (1) and in the other case during a period of 4 hours (2). After 6 hours the temperature of the polymerization batch was raised to 98–100° C. and the polymerization was terminated after a further 4 hours. The tricalcium phosphate was dissolved with dilute HCl or $H_2PO_4$, the polymer beads were washed until they were neutral and dried under reduced pressure.

The results are indicated in the following table.

| | Water-soluble initiator | | | | Particle size <1,200 microns, percent |
|---|---|---|---|---|---|
| | Type | Amount g. | Mode of addition | Yield, percent | |
| Examples: | | | | | |
| 1 | CPS | 0.007 | 1 | 98.5 | 93.5 |
| 2 | CPS | 0.007 | 2 | 99.0 | 94.7 |
| Comparative Examples: | | | | | |
| 1 | $K_2S_2O_8$ | 0.007 | 1 | 93.5 | 97.5 |
| 2 | $K_2S_2O_8$ | 0.007 | 2 | 93.6 | 98.5 |
| 3 | | | | Coagulation after 240 minutes | |
| 4 | Azo-bis-γ-cyano-valeric acid. | 0.165 | | Coagulation after 220 minutes | |

EXAMPLE 3

In this example a different proportion of phases of styrene to water was used. 1 gram of benzoyl peroxide and 0.01 gram of tertiary butylperbenzoate were dissolved in 500 grams of styrene, the monomer was mixed with 500 grams of water and 3.5 grams of TCP and the mixture was polymerized at 90° C. A solution of 0.01 gram of CPS was added in two aliquots to the polymerization batch, one at the beginning, the other after 4 hours. After 6 hours altogether, the temperature was raised to about 100° C., the polymerization was terminated after a further 4 hours and the polymer was isolated as described above.

The results obtained are indicated in the following table.

| Example | Water-soluble type | Initiator amount, g. | Yield, percent | Distribution of particle sizes | | | |
|---|---|---|---|---|---|---|---|
| | | | | >1,200μ | 750μ | 400μ | <400μ |
| 3 | CPS | 0.01 | 98 | 0.7 | 5.8 | 54 | 38 |
| 5 [1] | Azo-bis-γ-cyano-valeric acid | 0.125 | 94 | 13.2 | 31.2 | 41.2 | 14.0 |

[1] Comparative example.

EXAMPLE 4

660 grams of styrene, 2 grams of benzoyl peroxide and 0.01 gram of tertiary butyl perbenzoate were polymerized in the presence of 12 grams of stearic acid butyl ester in a suspension of 4.7 grams of TCP in 610 grams of water at 90° C. The water-soluble initiator was prepared in situ from potassium peroxysulfate and chloroformic acid ethyl ester. For this purpose at the beginning of the polymerization and after 4 hours each time 0.024 gram of potassium peroxysulfate in 10 cc. of water and 0.026 gram of chloroformic acid ethyl ester in 2 cc. of styrene were added. At the end of polymerization the temperature was raised to 100° C. and the reaction was terminated after 10 hours. Comparative examples were carried out with potassium peroxysulfate alone.

The results obtained are indicated in the following table.

| | Water-soluble initiator | | | | |
|---|---|---|---|---|---|
| Ex. | Potassium peroxy-sulfate | Amount, g. | Chloroformic acid ethyl ester | Amount g. | Yield percent |
| 4 | + | 0.048 | + | 0.046 | 9.85 |
| 6 [1] | + | 0.007 | | | [2] |
| 7 [1] | + | 0.014 | | | [2] |

[1] Comparative examples.
[2] Coagulation after 340 minutes.

What is claimed is:

1. A process for polymerizing vinylaromatic compounds or mixtures of vinylaromatic compounds with acrylonitrile, acrylic acid esters, methacrylic acid esters, vinyl ethers or vinyl esters, wherein the polymerization is performed in aqueous suspension, at a ratio of monomer phase to water phase of from 1:3 to 3:1, at a temperature in the range of from 20–160° C., in the presence of a monomer-soluble initiator consisting of organic peroxide or an azo compound in an amount from 0.005 to 5% by weight calculated on the monomer or mixture of monomers and in the presence of a powdery suspension stabilizer selected from the group consisting of alkaline earth metal salts of phosphoric or sulfuric acid in an amount from 0.02 to 1.5% by weight calculated on the starting mixture, and in the presence of a water-soluble initiator consisting of a peroxide of the general formula

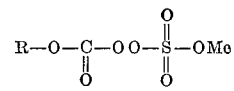

in which R stands for straight chain or branched alkyl radical having 1 to 20 carbon atoms, a cycloalkyl radical having 3 to 8 carbon atoms in the ring, an aryl or an aralkyl radical, and Me is an alkali metal or alkaline earth metal ion, said water soluble initiator being present in an amount of from 0.0001 to 0.02 part by weight calculated on the monomer or mixtures of monomers.

2. The process of claim 1, wherein the water soluble initiator is present in an amount of from 0.0005 to 0.005 part by weight.

3. The process of claim 1, wherein styrene, -methylstyrene or vinyltoluene is the vinylaromatic compound.

4. The process of claim 1, wherein the organic peroxides or azo compounds are present in amounts of from 0.005 to 1% by weight.

References Cited

UNITED STATES PATENTS 3,249,595  5/1966  Lederer et al.

HARRY WONG, JR., Primary Examiner

U.S. Cl. X.R.

260—86.7, 87.3, 88.1, 93.5